Dec. 2, 1969   A. M. PARUOLO   3,481,487
DISPLAY UNIT
Filed May 5, 1967
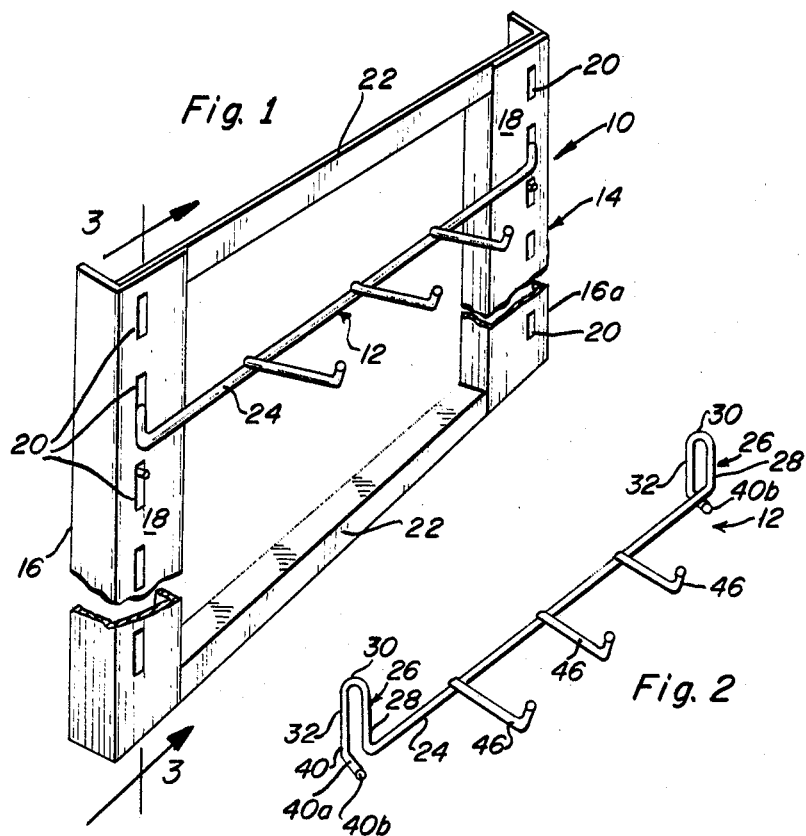
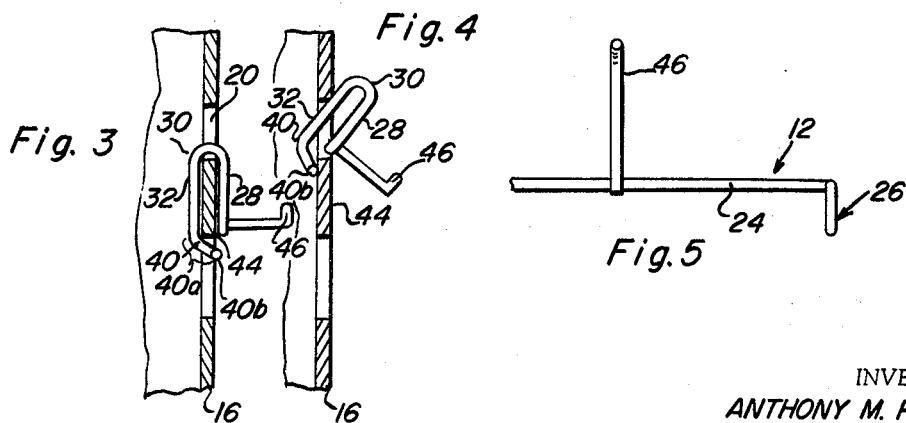
INVENTOR.
ANTHONY M. PARUOLO
BY PENDLETON, NEUMAN
SEIBOLD & WILLIAMS
ATTORNEYS United States Patent Office 3,481,487
Patented Dec. 2, 1969

3,481,487
DISPLAY UNIT
Anthony M. Paruolo, Norridge, Ill., assignor to Advertising Metal Display Co., Evanston, Ill., a corporation of Delaware
Filed May 5, 1967, Ser. No. 636,370
Int. Cl. A47f 5/01, 5/10
U.S. Cl. 211—176                                   8 Claims

ABSTRACT OF THE DISCLOSURE

An adjustable hook and rack display construction comprising a support structure containing a plurality of pairs of slots formed therein arranged in spaced apart parallel vertical lines, and a hook and crossbar display device extending between the slots and removably secured in the slots in said surfaces by means of hooks at each end of said crossbar.

---

This invention relates to a display device and more particularly to a display rack device having a plurality of adjustable, variable and movable display means adapted for display and storage of small items.

While many display constructions are available for storage and display of small items, such as tags, keys, house numbers, name plates, rings, washers, parts or the like, the devices have not been sufficiently versatile for modification to accommodate changes in a product line or for use with another product. The construction of the present invention is such as to particularly lend itself to a variety of display arrangements which can be readily modified to accommodate different shapes and sizes of goods.

Accordingly, one of the objects of the present invention is the provision of a simple and economical display hook and rack construction which is adapted to a variety of arrangements.

Another object is the provision of a display rack device in which display mountings are readily movable on a rack structure.

A further object is the provision of a hook and rack construction in which the movable display hook is formed of an economical one-piece structure.

A still further object is the provision of a novel display hook rack device which is removably secured into the display rack mounting by a novel spring or snap tension means.

The fulfillment of these and other objects of the present invention will become apparent in the following specification, appended claims and attached drawing.

Reference is now made to the drawings in which:

FIG. 1 is a partial perspective view of the assembled rack and hook construction of the present invention;

FIG. 2 is a perspective view of the hooked crossbar, mounting and display device shown in FIG. 1;

FIGS. 3 and 4 are partially cut-away sectional views of one frame member of the assembly of FIG. 1 in which the rack frame is shown cut away, and the hook and crossbar mount is shown in FIG. 3 in secured, and FIG. 4 in partially removed positions; and FIG. 5 is a partial top plan view of one end of the hook and crossbar assembly of FIG. 2.

Referring to the drawings there is illustrated in FIG. 1 the hook and rack display assembly of the present invention 10 comprising a hook and crossbar member 12 and a rack supporting member 14. The rack 14 comprises a pair of slotted frame members in the form of channels 16 having a front or mounting or display surface 18 containing a plurality of regularly spaced slots 20. The frame members 16 and 16a are maintained in spaced and generally parallel relationship to each other by connecting supports 22 or other similar spacing means which may be secured to the channels by welding, bolting or other similar fastening means. In use the rack frame members 16 and 16a are arranged vertically with the floor and may be provided with a base (not shown) or may be mounted on a wall, or may be arranged in a series of pairs in side by side relationship. The surfaces 18 are facing in a common direction of the frame members 16 and the regularly spaced slots define vertical lines which are in parallel spaced relationship to each other. Each slot 20 in the face 18 of member 16 has a corresponding counterpart in member 16a. The crossbar and hook display and mounting assembly 12 shown mounted in FIG. 1 and demounted in FIG. 2, are provided with a crossbar 24 having a pair of U-shaped end hooks 26 at either end thereof, which include a forward rising leg 28 which rises essentially at right angles to the crossbar 24, a rearward arcuate bend 30 corresponding with the bottom of the U and a rear descending leg 32.

The crossbar 24 and forward or rising leg 28 define a plane which in normal use is parallel with and essentially flush against the vertical plane defined by the surfaces 18 of members 16 and 16a. The two legs 28 and 32 of each U-shaped hook 26 define a plane at right angles to the axis of the crossbar and the plane established by the crossbar and forward legs 28 and the plane established by the surfaces 18.

The rear leg 32 of the U-shaped end hooks 26 as indicated descends downwardly from the bend 30 to point 40 which is essentially approximately at our slightly below the juncture of crossbar 24 and leg 28 but spaced rearwardly therefrom, and then angularly forwardly and downwardly, or angularly terminating at a point below the juncture of the crossbar 24 and forward leg 28 describing a sector 40a. The sector 40a from the point 40 to the end 40b forms a securing or locking nib. As shown in FIGS. 3 and 4 the end hooks 26 are formed to correspond with the spacing and size of the slots 20. The space between the inner surface hook bend 30 and the locking nib 40a is such as to provide a relatively snug grasping fit around the metal sector 44 between the slots 20. The slots 20 are of such length that the hooks 26 can easily be withdrawn by raising and tilting as shown in FIG. 4.

As shown in FIG. 2, the hook and crossbar assembly 12 is preferably of one-piece construction usually of relatively rigid but resilient steel rods. The nature of the rod steel is preferably such that the U-shaped hook forms a resilient locking loop 26 around the sector 44 with a slight springing action. The hooks 26 and associated crossbar 24 assembly is thus held in clasping engagement about the sectors 44 which form part of the frames 16 and 16a between the slots 20.

The hooks are disengaged by rearward pressure on the end 40b which slightly spreads or deforms the legs 28 and 32 of U-shaped hook 26 permitting disengagement of the same from the rack frame members 16 and 16a. When assembled in display position, as shown in FIG. 3, the end 40b of the locking nib 40a on hook 26 protrudes slightly from the next lower slot in the frame 16. Thumbnail pressure exerted on 40b permits easy disengagement of the nib 40a of the hook and crossbar assembly 12 by clockwise rotation. The spring pressure also results in the "snap-in" fit of the hooks on the rack members by rotation counterclockwise as shown in the orientation FIG. 4, which is an illustration of a hook end being disengaged or engaged in a rack.

Mounting means 46 in the form of L-shaped members or hooks are shown in this embodiment affixed to the cross member 24 generally at right angles to the axis of the crossbar and perpendicular to the plane established by the surfaces 18 of the rack frame members 16 and the overlying plane established by the axis of crossbar 24 and vertical legs 28. These mounting means may be in number and spacing as desired. They may also be a variety of shapes. They are affixed to the crossbar 24 by spot or tack welding.

As may readily be seen, the foregoing structure is adaptable for use in displaying a variety of items on a simple rack. The mounting units 12 can be placed in a variety of positions on the rack. The units furthermore can be adapted to a number of uses by varying the spacing and size of the mounting means 46 on the crossbar 24.

In another specific embodiment (not shown) the mounting units 12 can be mounted on a support surface having a plurality of pairs of slots arranged in spaced apart parallel vertical lines. In this particular embodiment the surfaces 18 shown in the drawing would be formed of a single sheet and surface. Thus any sheet or surface can be adapted to the teachings of the present invention by providing therein a plurality of slots arranged in parallel spaced apart relationship. While it is conventional to have these slots or mounting apertures arranged in generally parallel vertical lines, it is possible also, when utilizing a single mounting surface, to provide a plurality of slots disposed in various parts of the surface, the only requirement being that in a particular mounting relationship the U-shaped hooks on the mounting unit 12 must be capable of matching the slots formed in said surface.

In a further specific embodiment (also not shown) a group of four racks of the type shown in FIG. 1 can be assembled into a quadrilateral free standing display unit, on a suitable base adapted for rotation. The crossbar mounting units are basically simple one-piece bent units which can be fabricated at minimum cost and few mechanical operations.

While one particular embodiment has been illustrated in the foregoing, it can be readily appreciated that other variations and embodiments can be made incorporating the principles set forth herein to produce a variety of related and similar devices without departing from the true spirit and scope of this invention.

What is claimed is:

1. A hook and rack display construction comprising a vertical support surface and structure in sheet form having a plurality of spaced mounting slot apertures formed therein, said apertures being arranged in lines in vertical parallel spaced relationship and spaced from each other within said lines, and a crossbar with mounting means having U-shaped hook securing means formed at both ends thereof spaced to correspond with a pair of said slots and adapted to fit in securing relationship around the portion of the sheet between the slots, and display means secured to said crossbar between the ends thereof.

2. A hook and rack display construction of claim 1 wherein said vertical pairs of parallel slots are formed in parallel spaced supporting frame means providing a pair of apertured support surfaces, said crossbar having one or more display mounting means secured to said crossbar between the ends thereof.

3. A construction according to claim 1 wherein the U-shaped hooks are formed at essentially right angles to the crossbar.

4. A construction according to claim 1 wherein said U-shaped means have a forward leg portion co-terminus with said crossbar and extending upwardly and at essentially right angles thereto, arcuately rearwardly and downwardly to form a generally parallel rear leg of the U, said rear leg further extending angularly forward and down to terminate essentially at a point below the juncture of the forward leg portion and the crossbar and forward leg and the plane at right angles thereto established by the legs of the U-shaped hook.

5. The construction according to claim 1 wherein the terminal portion of the rear leg of the U-shaped hook securing means protrudes from the aperture immediately below the slot in which the hook means are inserted.

6. The construction according to claim 1 wherein the U-shaped hook securing means are formed to circumferentially engage and clasp the portion of the sheet between said slots.

7. The construction according to claim 2 wherein the spaced mounting apertures comprise a generally parallel series of elongated slots in the face of each of said frame means in predetermined registering relationship to each other.

8. A construction according to claim 1 wherein said U-shaped hooked securing means comprise a forward leg portion extending upwardly at essentially right angles to said crossbar arcuately rearwardly and then downwardly to form a rear leg of said U depending from said arcuate portion, generally parallel to said forward leg for approximately the same length, said rear leg further extending downwardly and angularly forwardly to terminate at a point spaced from and below the juncture of the forward leg and crossbar and in the plane at right angles thereto established by the legs of the U-shaped hook, the space between the bend of said hook and the angular termination sector being adapted to circumferentially engage and secure the portion of the support sheet between the formed slots.

References Cited

UNITED STATES PATENTS

| | | | |
|---|---|---|---|
| 1,417,215 | 5/1922 | Syrett | 248—303 |
| 2,872,145 | 2/1959 | Goldsholl | 248—223 |
| 2,954,125 | 9/1960 | Husted | 248—223 XR |
| 2,987,288 | 6/1961 | Shanks | 248—224 |
| 3,095,975 | 7/1963 | Cassel et al. | 211—148 |

ROY D. FRAZIER, Primary Examiner

RAYMOND D. KRAUS, Assistant Examiner

U.S. Cl. X.R.

211—86; 248—223